United States Patent
Evans, Jr.

[15] 3,673,693
[45] July 4, 1972

[54] MEASURING WHEEL APPARATUS

[72] Inventor: Wallace D. Evans, Jr., Malibu, Calif.

[73] Assignee: Rolatape Corporation, Santa Monica, Calif.

[22] Filed: Feb. 1, 1971

[21] Appl. No.: 111,561

[52] U.S. Cl. ............................................33/141 R, 235/95 R
[51] Int. Cl. .................G01b 3/12, G01c 22/00, G01b 7/04
[58] Field of Search.....................235/95, 95 B, 96; 33/141 R, 33/141 E, 141.5

[56] References Cited

UNITED STATES PATENTS

| | | | |
|---|---|---|---|
| 2,312,136 | 2/1943 | Van Triest | 33/141 R |
| 2,557,481 | 6/1951 | Staples et al. | 33/141 R |
| 3,251,132 | 5/1966 | Hall | 33/141 R |
| 3,196,545 | 7/1965 | Zell et al. | 33/141 R |

FOREIGN PATENTS OR APPLICATIONS

| | | | |
|---|---|---|---|
| 1,259,470 | 3/1961 | France | 33/141 R |
| 584,893 | 9/1933 | Germany | 33/141 R |
| 347,643 | 8/1960 | Switzerland | 33/141 R |

*Primary Examiner*—Richard B. Wilkinson
*Assistant Examiner*—Stanley A. Wal
*Attorney*—Robert E. Geauque

[57] ABSTRACT

A measuring wheel apparatus where the rotatable wheel is mounted upon a conical recessed hub, a counter mechanism is secured to the wheel and extends within the recessed hub, the counter mechanism being adapted to record the rotational movement of the wheel, the wheel being connected to the counter mechanism by the flange of a sleeve element which is threadably secured within the counter mechanism, the driving connection for the counter mechanism being established by a shaft passing through the sleeve element, the shaft being attached to a cap which is secured to the hub of the wheel.

9 Claims, 4 Drawing Figures

PATENTED JUL 4 1972
3,673,693
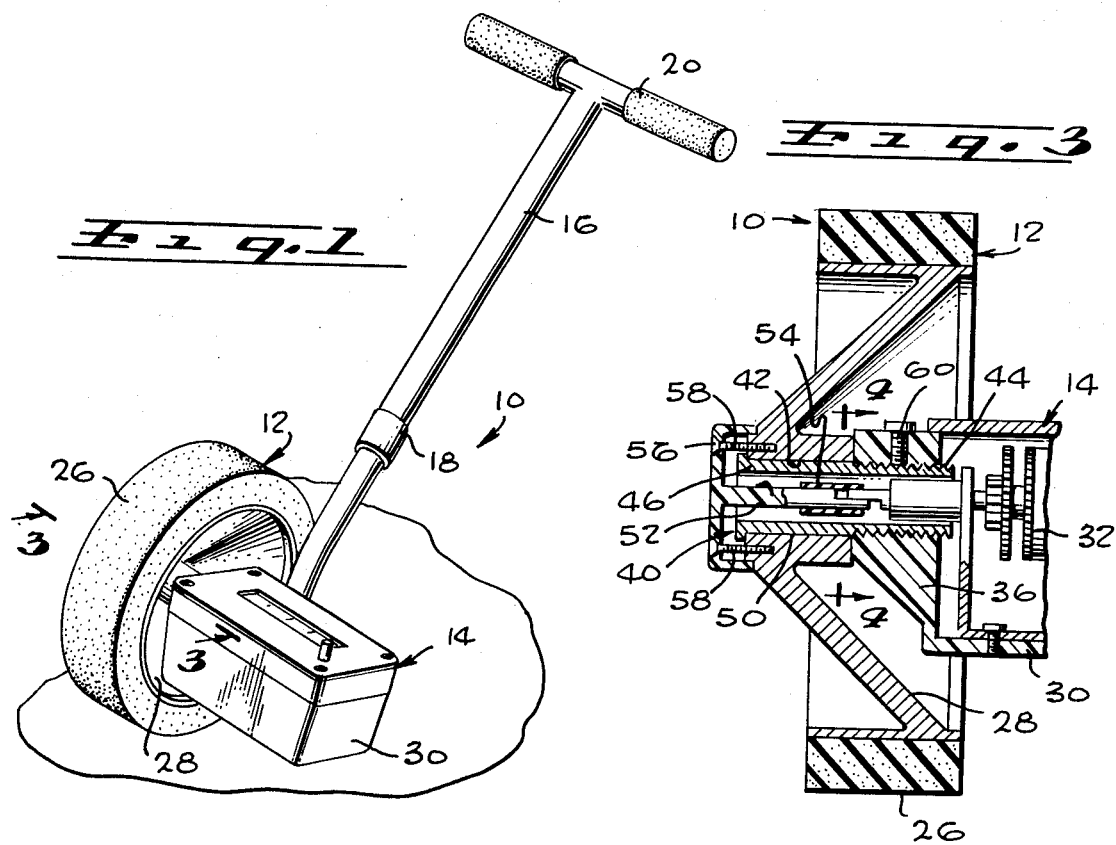
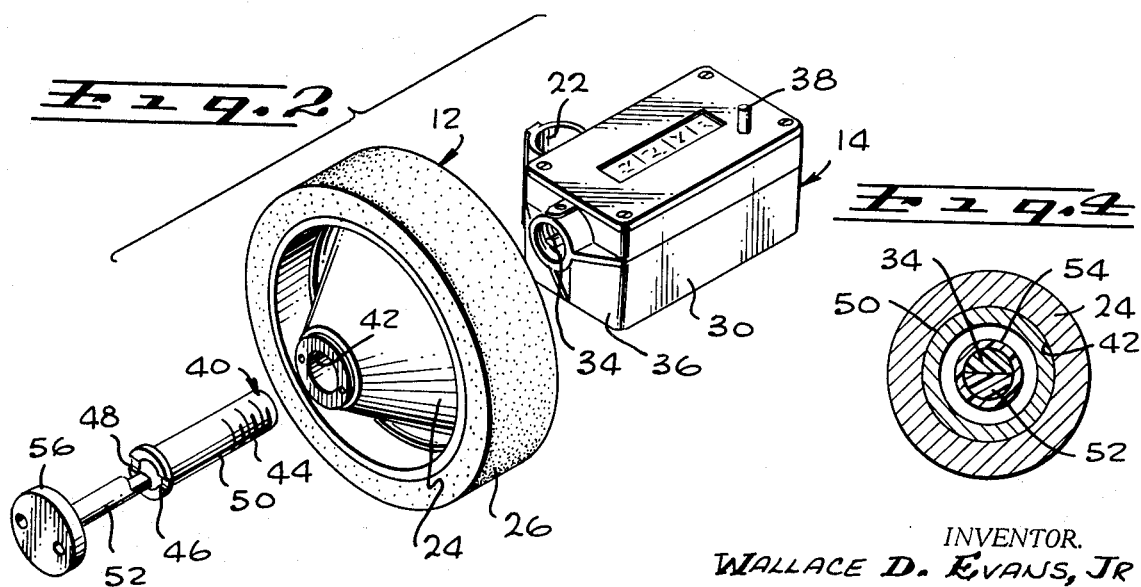
INVENTOR.
WALLACE D. EVANS, JR
BY
R. E. Geangue
ATTORNEY

MEASURING WHEEL APPARATUS

BACKGROUND OF THE INVENTION

The field of this invention relates to measuring instruments of the wheel type for taking lineal measurements, and in particular relates to novel and useful improvements in a measuring wheel therefor.

It has been common to employ the use of a measuring wheel to measure ground measurements. Primarily, such measuring wheels have been used in agriculture for the determining of acreage and by contractors in the constructing of roads and highways.

Although such measuring wheels in the past have been designed for use in the outdoors environment, there has been a definite need for such a measuring wheel to be used indoors by building contractors, real estate appraisers, insurance agents, plus many other indoor uses. Normally, an outdoor measuring wheel is of too large a diameter to make practical the use of such a wheel indoors. Therefore, recently a measuring wheel, having a relatively small diameter, is being employed to effect indoor measurements accurately.

All measuring wheels must employ some type of counter mechanism to measure the rotational movement of the measuring wheel. Normally, the resolution of measurement is in feet and inches. The counter mechanism is mounted adjacent the hub of the wheel and extends axially therefrom. The handle of the device, which is to facilitate the movement of the measuring wheel, is normally secured to the counter mechanism thereby permitting complete freedom of movement of the measuring wheel. It has been found to be desirable that the center of gravity of the entire device, in other words, the handle, the counter mechanism, and the wheel, be substantially in-line with the centerline of wheel travel. If the location of the center of gravity is not so established, a natural imbalance occurs which produces a torque during use, tending to move the wheel away from its intended path. Also, such a torque tends to create wheel wobble which causes inaccuracy of measurement.

When the wheel has a large diameter (common in the outdoors type of wheel), such imbalance has little effect. However, in the small diameter wheel, the imbalance is more apparent and causes inaccuracy in measurement.

In the past, it has been known to employ a conical shaped hub within a rim. The counter mechanism is then extended within the recess portion of the hub, which thereby moves the resultant center of gravity nearer the centerline of the wheel movement. With the center of gravity being moved to the desired location, the wheel is normally connected to the counter mechanism through a combination shaft member and wheel bearing element. It has been found that over a period of time the wheel may become disassociated from the wheel bearing element, with the result being that the wheel becomes disconnected from the counter mechanism. Therefore, there has been a definite need for the use of a positive securing wheel bearing element for use in measuring wheel apparatuses.

SUMMARY OF THE INVENTION

The measuring wheel apparatus of this invention is designed to have a relatively small diameter (approximately 4 inches) measuring wheel, and have a measuring surface comprising a frictional material (such as neoprene rubber). The hub portion of the wheel is conically shaped with the counter mechanism being secured within the hub portion and extending within the recess of the conical hub. A tubular handle is fixedly secured to the counter mechanism by means of an attaching bracket. A cylindrical hollow sleeve is to cooperate with the central opening within the hub of the measuring wheel. One end of the sleeve is connected to a flange which is to be located in abutting relationship with the hub of the measuring wheel. The sleeve is to also include a bearing surface upon which is rotatably mounted the measuring wheel. The free end of the sleeve is exteriorly threaded and is adapted to cooperate in a secure manner with the counter mechanism. A driving shaft is adapted to pass through the sleeve element and be operatively connected to the counter mechanism. The driving shaft is secured to a cap which is fixedly secured to the hub of the measuring wheel and surrounding flange.

BRIEF DESCRIPTION OF THE DRAWING

FIG. 1 is an overall isometric view of the measuring wheel apparatus of this invention;

FIG. 2 is an exploded isometric view clearly showing the different elements employed to effect the connection between the measuring wheel and the counter mechanism;

FIG. 3 is a cross sectional view taken along line 3—3 of FIG. 1 showing the novel connection between the measuring wheel and the counter mechanism; and FIG. 4 is a cross sectional view taken along line 4—4 of FIG. 3.

BRIEF DESCRIPTION OF THE SHOWN EMBODIMENT

Referring particularly to the drawing, there is shown in FIG. 1 the measuring wheel apparatus 10 of this invention being composed primarily of a measuring wheel 12, a counter mechanism 14, and a handle 16. The handle 16 is to be composed of two elements which are telescopingly connected together through a clamp 18. The upper end of handle 16 includes a grasping section 20. The lower end of the handle 16 is fixedly secured to the counter mechanism 14 by means of an attaching bracket 22.

The measuring wheel itself is composed of a hub section 24 and a frictional outer surface 26. The frictional outer surface is to be composed of a composition of material which resists slippage of the measuring wheel upon the surface being measured. One such material would be neoprene rubber. However, many other types of materials could be employed.

The hub section 24 is designed to be conical in configuration. The primary reason for the conical configuration is that the counter mechanism 14 can be connected to the hub section within the recess 28 of the conical shaped hub section 24. The reason for this is that the overall center of gravity of the apparatus 10 is moved more nearly in-line with the centerline of travel of the surface 26 during use. As a result, imbalance of the overall apparatus is decreased and the measuring wheel 12 tends to move in a straight line on the to be measured surface without wobbling.

The structure of the counter mechanism 14 is basically conventional and need not be described here in detail. However, it is to be understood that the counter mechanism 14 includes an outer housing 30, a counter 32, the counter 32 being connected to an operating shaft 34. The operating shaft 34 passes through an end plate 36 which closes off an end of the housing 30. The counter mechanism 14 also includes a reset button 38 to facilitate location of the counter 32 back to the zero position.

A hollow cylindrical sleeve 40 is to be passed through the central opening 42 within the hub section 24. One end of the sleeve 40 is exteriorly threaded at 44 and is to be secured within an opening in the end plate 36. A set screw 60 is located within the end plate 36 to lock the sleeve 40 when located as desired within the end plate 36. The operating shaft 34 is adapted to extend interiorly and axially along the sleeve 40 when such is connected to the end plate 36. The free end of the sleeve 40 is formed into a flange 46. With the sleeve 40 so installed within the end plate 36, the flange 46 is to be in abutting relationship with the hub section 24. Aligned slots 48 are located within the flange 46 to facilitate the connection by a tool (such as a screwdriver) of the measuring wheel 12 to the counter mechanism 14. A bearing surface 50 is formed upon the exterior surface of the sleeve 40 in between the threads 44 and the flange 46. The bearing surface 50 is to effect low frictional rotation of the measuring wheel 12 with respect to the sleeve 40. Although this is a direct metal to metal contact, low frictional movement therebetween is effected due to the instituting of a moisture repellent lubricant therebetween. Such lubricants are well known and need not be described here in detail. However, the reason for such a connection is so that there should never be a need to relubricate the bearing surface 50 during the entire life of the apparatus 10.

A driving shaft 52 is operatively connected to the operating shaft 34. The operating shaft 34 and the driving shaft 52 are held in a power transmitting manner by a plastic sleeve 52. The driving shaft 52 is integrally connected to a cap 56. The cap 56 is adapted to surround the flange 46 and be secured to the hub section 24 by means of fasteners 58. The cap 56 matingly cooperates with an annular recess upon the hub 24 which insures correct centerinG of the cap 56 thereon. Fasteners 58 are parallel to the shaft 34 and the sleeve 52 which effects an extremely positive securing arrangement to the hub 24. Also, the fasteners 58 extend into adequate hub material which is not possible if the fasteners extend perpendicular to the sleeve 52. The cap 56 has two functions, the first being to transmit the rotational movement of the measuring wheel 12 through the driving shaft 52 to the operating shaft 34 and thereupon to the counter 32. The second function being to prevent the entry of foreign material interiorly of the sleeve 40.

With the apparatus 10 of this invention being constructed as shown in FIG. 3 of the drawings, it can be readily seen that the flange 46 will absolutely preclude accidental dislodgement of the measuring wheel 12 with respect to the counter mechanism 14. This is the primary feature of the structure of this invention. Also, the bearing surface 50 facilitates the location of a moisture repellent lubricant low frictional connection between the hub section 24 of the measuring wheel 12 and the sleeve 40. Additionally, another feature of the apparatus of this invention is that the power transmitting elements comprising the cap 56, the driving shaft 52, and the sleeve 54, and the operating shaft 34, do not carry any weight and their only function is to transmit the rotational power of the measuring wheel 12 to the counter 32. Therefore, the aforesaid element can be constructed of a light-weight, low strength material without worrying about a possible failure after an extended period of use.

The operation itself of the measuring wheel apparatus 10 of this invention is believed to be well known. Basically, an operator grasps the grasping section 20 of the handle 16 and effects movement of the measuring wheel 12 upon a surface to be measured. The operator effects the movement between two points upon the surface upon which it is desired to obtain the distance between said points.

Numerous modifications could be employed without departing from this invention. For example, the handle 16 could be formed as a unitary element or made in three or more elements. Also, the hub 24 and the sleeve 40 could be molded into an integral unit. Further, the sleeve 40 could be formed out of plastic. Additionally, the entire wheel 12 could be formed as an integral unit out of plastic or rubber.

What is claimed is:

1. A measuring wheel apparatus comprising:
a measuring wheel having a rim portion and a hub portion, said rim portion adapted to come into contact with a surface to be measured, said hub portion having a central opening therein;
a counter mechanism located within a housing and adapted to record the rotational movement of said wheel, said counter mechanism including an operating shaft;
a driving shaft operatively connected to said operating shaft, said driving shaft connected by a first means to said hub portion; and
second means to rotatably support said wheel, said second means absolutely precluding accidental dislodgement of said wheel with respect to said counter mechanism, said second means being fixedly secured by a third means to said housing.

2. An apparatus as defined within claim 1 wherein:
said second means including a cylindrical tubular sleeve, a fourth means attached adjacent the free end of said sleeve to establish a positive retention upon said wheel, a bearing surface formed exteriorly upon said sleeve and located intermediate said third means and said fourth means, said bearing surface to rotatably support said wheel.

3. A measuring wheel apparatus comprising:
a measuring wheel having a rim portion and a hub portion, said rim portion adapted to come into contact with a surface to be measured, said hub portion having a central opening therein;
a counter mechanism adapted to record the rotational movement of said wheel, said counter mechanism including an operating shaft;
a driving shaft operatively connected to said operating shaft, said driving shaft connected by a first means to said hub portion;
second means to rotatably support said wheel with respect to said counter mechanism, said second means absolutely precluding accidental dislodgement of said wheel with respect to said counter mechanism;
said second means including a cylindrical tubular sleeve, attached adjacent one end of said sleeve is a third means to facilitate connecting of said sleeve to said counter mechanism, a fourth means attached adjacent the opposite end of said sleeve to establish a positive retention upon said wheel, a bearing surface formed exteriorly upon said sleeve and located intermediate said third means and said fourth means; and
said fourth means comprises a flange, said flange being adapted to abut said hub portion.

4. An apparatus as defined within claim 3 wherein:
said third means comprises screw threads.

5. An apparatus as defined within claim 4 wherein:
a set screw located within said counter mechanism being adapted to contact said screw threads.

6. An apparatus as defined within claim 5 wherein:
said bearing surface establishing metal to metal contact with said wheel.

7. An apparatus as defined within claim 6 wherein:
said driving shaft being attached to a cap, said cap enclosing said flange and being secured to said hub portion.

8. An apparatus as defined within claim 7 wherein:
said hub portion being conical in configuration.

9. An apparatus as defined in claim 7 wherein:
said cap cooperating with an annular recess formed upon said hub portion, at least one fastener securing said cap upon said hub portion, said fastener being substantially parallel to the axis of said driving shaft.

* * * * *